(12) United States Patent
Croke et al.

(10) Patent No.: US 6,842,881 B2
(45) Date of Patent: Jan. 11, 2005

(54) RULE BASED SYSTEM AND METHOD FOR AUTOMATICALLY GENERATING PHOTOMASK ORDERS IN A SPECIFIED ORDER FORMAT

(75) Inventors: Charles E. Croke, Waterbury, CT (US); Nicolas P Ridgway, Waterbury, CT (US)

(73) Assignee: Photronics, Inc., Brookfield, CT (US)

( * ) Notice: Subject to any disclaimer, the term of this patent is extended or adjusted under 35 U.S.C. 154(b) by 0 days.

(21) Appl. No.: 10/209,254

(22) Filed: Jul. 30, 2002

(65) Prior Publication Data

US 2004/0025137 A1 Feb. 5, 2004

(51) Int. Cl.⁷ .............................................. G06F 17/50
(52) U.S. Cl. ............................. 716/1; 705/26; 705/27; 700/121
(58) Field of Search .................... 716/1, 19–21, 716/4, 11; 705/26–27, 75; 700/121; 717/104–108

(56) References Cited

U.S. PATENT DOCUMENTS

| | | | |
|---|---|---|---|
| 3,698,072 A | * 10/1972 | Koens et al. | ............... 700/121 |
| 3,900,737 A | 8/1975 | Collier et al. | |
| 4,149,246 A | 4/1979 | Goldman | |
| 4,875,162 A | 10/1989 | Ferriter et al. | |
| 5,117,354 A | 5/1992 | Long et al. | |
| 5,260,866 A | 11/1993 | Lisinki et al. | |
| 5,563,702 A | 10/1996 | Emery et al. | |
| 5,570,291 A | 10/1996 | Dudle et al. | |
| 5,570,292 A | 10/1996 | Abraham et al. | |
| 5,694,551 A | 12/1997 | Doyle et al. | |
| 5,870,771 A | 2/1999 | Oberg | |
| 5,909,570 A | * 6/1999 | Webber | ........................ 703/13 |
| 5,950,201 A | * 9/1999 | Van Huben et al. | .......... 707/10 |
| 5,969,972 A | * 10/1999 | Kerszykowski et al. | .... 700/121 |
| 6,012,070 A | * 1/2000 | Cheng et al. | ............... 715/505 |
| 6,212,441 B1 | 4/2001 | Hazama et al. | |
| 6,324,521 B1 | 11/2001 | Shiota et al. | |
| 6,363,358 B1 | 3/2002 | Palmer et al. | |
| 6,526,545 B1 | * 2/2003 | Lin et al. | ........................ 716/4 |
| 6,615,166 B1 | * 9/2003 | Guheen et al. | ............... 703/27 |
| 6,622,295 B1 | * 9/2003 | Schepp et al. | ................ 716/19 |
| 6,662,340 B2 | * 12/2003 | Rawat et al. | ............... 715/507 |
| 6,725,122 B2 | * 4/2004 | Mori et al. | ................. 700/121 |
| 2002/0013731 A1 | 1/2002 | Bright et al. | |

(List continued on next page.)

FOREIGN PATENT DOCUMENTS

| WO | WO-02/03141 A2 | 1/2002 | |
|---|---|---|---|
| WO | WO 02/03141 * | 1/2002 | ............. G03F/1/00 |

OTHER PUBLICATIONS

Edward Suttile, Charles Croke, and James Morrrison, *Behind The Mask: Streamlining The Front–End Reticle Fabrication Process By Improving Mask Ordering*, MICRO Magazine, Jun. 2002, p. 1–5.

Photronics, Screenshots from Align Rite system (9 sheets) see attached "Description of AlignRite Screenshots".

*Primary Examiner*—Matthew Smith
*Assistant Examiner*—Naum Levin
(74) *Attorney, Agent, or Firm*—Amster, Rothstein & Ebenstein LLP (57) ABSTRACT

The present invention relates generally to a rule based system and method for automatically generating photomask orders in a specified format, and more particularly, relates to software which includes templates in which photomask order data is entered and rules for guiding the user in entering such data and rules for ensuring that such data is entered accurately. The rules and templates implemented in the present invention are organized and stored in a manner which allows for the software to be easily adapted to meet the criteria of any existing standard (e.g., SEMI P10) or proprietary photomask order format now known or hereinafter developed. Additionally, the software of the present invention provides for the ability to generate new photomask orders using templates and/or existing photomask order data.

117 Claims, 4 Drawing Sheets

U.S. PATENT DOCUMENTS

| | | |
|---|---|---|
| 2002/0013742 A1 | 1/2002 | Shiota et al. |
| 2002/0055878 A1 | 5/2002 | Burton et al. |
| 2002/0059122 A1 | 5/2002 | Inoue et al. |
| 2002/0062475 A1 * | 5/2002 | Iborra et al. ................ 717/108 |
| 2002/0091991 A1 * | 7/2002 | Castro ........................ 717/106 |
| 2002/0111164 A1 * | 8/2002 | Ritter ......................... 455/426 |
| 2002/0184266 A1 * | 12/2002 | Blessin ....................... 707/513 |
| 2003/0061587 A1 * | 3/2003 | Zhang et al. ................. 716/11 |
| 2003/0177469 A1 * | 9/2003 | Suttile et al. ................ 716/21 |
| 2004/0054633 A1 * | 3/2004 | Huyghe et al. ............... 705/75 |

* cited by examiner

RULE BASED SYSTEM AND METHOD FOR AUTOMATICALLY GENERATING PHOTOMASK ORDERS IN A SPECIFIED ORDER FORMAT

FIELD OF THE INVENTION

The present invention generally relates to a rule based system and method for automatically generating photomask orders in a specified format, and more particularly, relates to a software-based application which automatically generates photomask orders in a specified format through the use of templates and rules which guide a user through the process of generating a photomask order in a complete and accurate manner. The rules and templates are established based on the requirements of a particular standard (e.g., SEMI P10) or propriety photomask order format and are organized and stored in a manner which can be adapted to meet the criteria of both modified and new photomask order formats now known or hereinafter developed. Additionally, the system and method of the present invention provides for the ability to generate new photomask orders using existing photomask order data.

BACKGROUND OF THE INVENTION

Photomasks are high precision plates containing microscopic images of electronic circuits. Photomasks are typically made from very flat pieces of quartz or glass with a layer of chrome on one side. Etched in the chrome is a portion of an electronic circuit design. This circuit design on the mask is also called "geometry".

Figure 1:
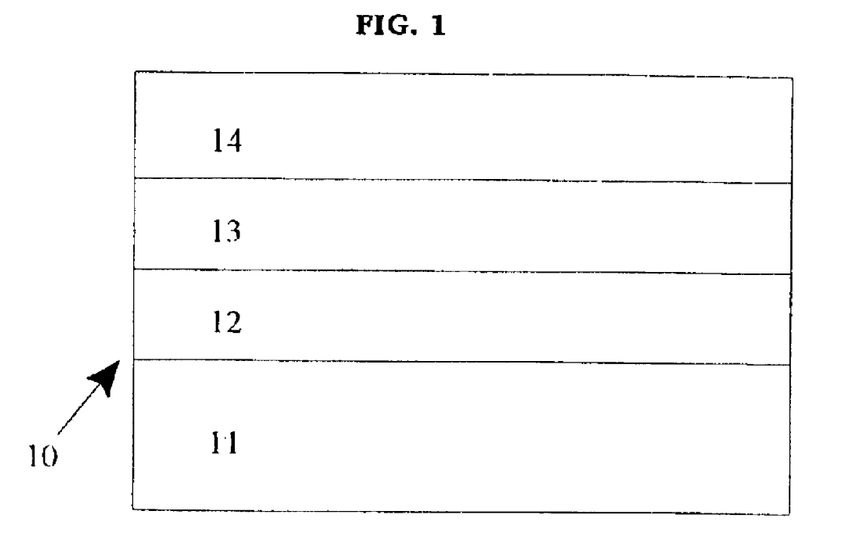
FIG. 1 represents a blank or undeveloped photomask of the prior art.

A typical photomask used in the production of semiconductor devices is formed from a "blank" or "undeveloped" photomask. As shown in FIG. 1, a typical blank photomask 10 is comprised of three or four layers. The first layer 11 is a layer of quartz or other substantially transparent material, commonly referred to as the substrate. The next layer is typically a layer of opaque material 12, such as Cr, which often includes a third layer of antireflective material 13, such as CrO. The antireflective layer may or may not be included in any given photomask. The top layer is typically a layer of photosensitive resist material 14. Other types of photomasks are also known and used including, but not limited to, phase shift masks, embedded attenuated phase shift masks ("EAPSM") and alternating aperture phase shift masks ("AAPSM").

The process of manufacturing a photomask involves many steps and can be time consuming. In this regard, to manufacturer a photomask, the desired pattern of opaque material 12 to be created on the photomask 10 is typically defined by an electronic data file loaded into an exposure system which typically scans an electron beam (E-beam) or laser beam in a raster or vector fashion across the blank photomask. One such example of a raster scan exposure system is described in U.S. Pat. No. 3,900,737 to Collier. Each unique exposure system has its own software and format for processing data to instruct the equipment in exposing the blank photomask. As the E-beam or laser beam is scanned across the blank photomask 10, the exposure system directs the E-beam or laser beam at addressable locations on the photomask as defined by the electronic data file. The areas of the photosensitive resist material that are exposed to the E-beam or laser beam become soluble while the unexposed portions remain insoluble. In order to determine where the E-beam or laser beam should expose the photoresist 14 on the blank photomask 10, and where it should not, appropriate instructions to the processing equipment need to be provided, in the form of a jobdeck.

Figure 2:
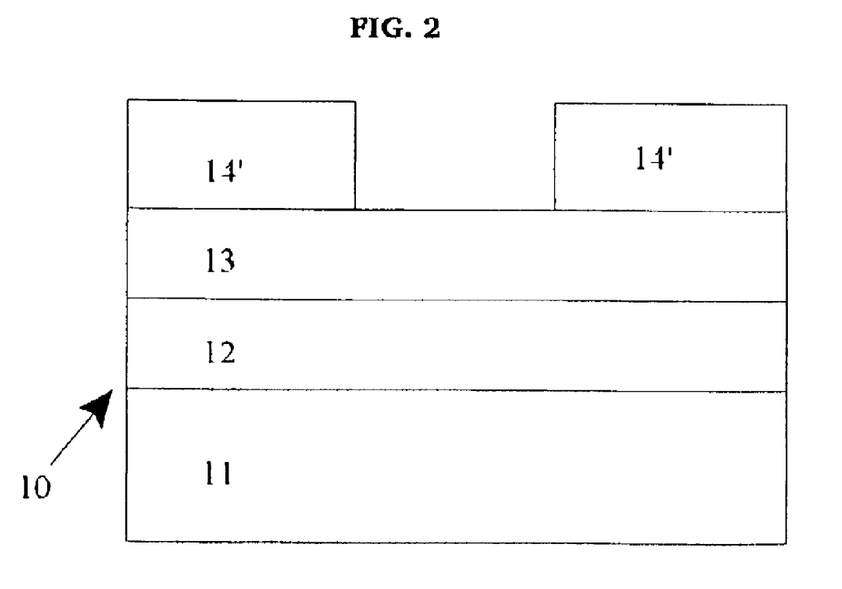
FIG. 2 represents the photomask of FIG. 1 after it has been partially processed.

After the exposure system has scanned the desired image onto the photosensitive resist material 14, as shown in FIG. 2, the soluble photosensitive resist material is removed by means well known in the art, and the unexposed, insoluble photosensitive resist material 14' remains adhered to the opaque material 13 and 12. Thus, the pattern to be formed on the photomask 10 is formed by the remaining photosensitive resist material 14'.

Figure 3:
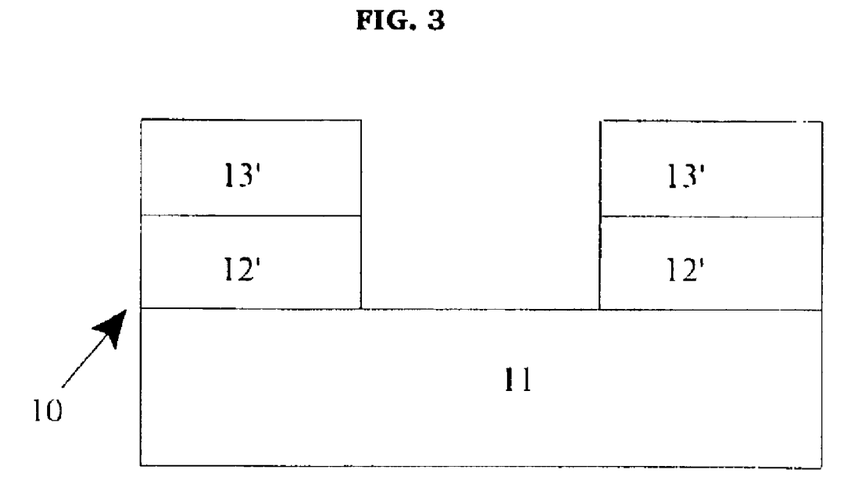
FIG. 3 represents the photomask of FIGS. 1 and 2 after it has been fully processed.

The pattern is then transferred from the remaining photoresist material 14' to the photomask 10 via known etch processes to remove the antireflective material 13 and opaque materials 12 in regions which are not covered by the remaining photoresist 14'. There is a wide variety of etching processes known in the art, including dry etching as well as wet etching, and thus a wide variety of equipment used to perform such etching. After etching is complete, the remaining photoresist material 14' is stripped or removed and the photomask is completed, as shown in FIG. 3. In the completed photomask, the pattern as previously reflected by the remaining antireflective material 13' and opaque materials 12' are located in regions where the remaining photoresist 14' remain after the soluble materials were removed in prior steps.

In order to determine if there are any unacceptable defects in a particular photomask, it is necessary to inspect the photomasks. A defect is any flaw affecting the geometry. This includes chrome where it should not be (chrome spots, chrome extensions, chrome bridging between geometry) or unwanted clear areas (pin holes, clear extensions, clear breaks). A defect can cause the customer's circuit not to function. The customer will indicate in its defect specification the size of defects that will affect their process. All defects that size and larger must be repaired, or if they can not be repaired, the mask must be rejected and rewritten.

Typically, automated mask inspection systems, such as those manufactured by KLA-Tencor or Applied Materials, are used to detect defects. Such automated systems direct an illumination beam at the photomask and detect the intensity of the portion of the light beam transmitted through and reflected back from the photomask. The detected light intensity is then compared with expected light intensity, and any deviation is noted as a defect. The details of one system can be found in U.S. Pat. No. 5,563,702 assigned to KLA-Tencor.

After passing inspection, a completed photomask is cleaned of contaminants. Next, a pellicle may be applied to the completed photomask to protect its critical pattern region from airborne contamination. Subsequent through pellicle defect inspection may be performed. In some instances, the photomask may be cut either before or after a pellicle is applied.

To perform each of the manufacturing steps described above, a semiconductor manufacturer (e.g., customer) must first provide a photomask manufacturer with different types of data relating to the photomask to be manufactured. In this regard, a customer typically provides a photomask order which includes various types of information and data which are needed to manufacture and process the photomask, including, for example, data relating to the design of the photomask, materials to be used, delivery dates, billing information and other information needed to process the order and manufacture the photomask.

A long standing problem in the manufacture of photomasks is the amount of time it takes to manufacture a photomask from the time a photomask order is received from a customer. In this regard, the overall time it takes to process a photomask order and manufacture a photomask can be lengthy, and thus, the overall output of photomasks is not maximized. Part of this problem is attributable to the fact that many customers who order photomasks often place their orders in a variety of different formats which are often not compatible with the photomask manufacturer's computer system and/or manufacturing equipment. Accordingly, the photomask manufacturer is often required to reformat the order data and condition it into a different format which is compatible with its computer system and/or manufacturing equipment, which can take a great deal of time, and thus, delay the time it takes to manufacture a photomask.

In an attempt to address these problems, the photomask industry has developed various standard photomask order formats in which photomask orders should be placed. For example, the SEMI P10 standard is one standard format used in the manufacture of photomasks. Additionally, a few semiconductor manufacturers have developed their own proprietary photomask order format in which photomask orders are to be placed, rather than adopting a standard format. These standard and proprietary photomask order formats were created so that photomask orders would be received from customers in a uniform format, thereby reducing the overall time it takes to manufacture a photomask.

Although the use of such standard and/or proprietary photomask order formats are useful in reducing the time it takes to manufacture photomasks, many semiconductor manufacturers have been reluctant to place their photomask orders in such standard and/or proprietary formats for a variety of reasons. For example, the SEMI P10 standard order format is quite complicated and requires the customer placing the order to have a sophisticated working knowledge of the requirements associated with such standard. Since many semiconductor manufacturers do not manufacture photomask, such manufacturers may not have the resources, time or ability to learn the intricacies of such standard format. Thus, semiconductor manufacturers often provide a photomask manufacturer with photomask order data in an unorganized and often incomplete manner. As a result, the photomask manufacturer is required to parse through this data and organize it in a useful format (e.g., in the SEMI P10 format). Additionally, in those instances where incomplete photomask order data is provided to a photomask manufacturer, such manufacturer will be required to request the missing information from the customer. As a result, a great deal of time is often wasted in the process of obtaining a complete and accurate photomask order, and thus, the overall time that it takes to manufacture a photomask can be greatly delayed. There has been a long felt need in the field of photomask manufacture for a customer side system and method for automatically generating a complete and accurate photomask order in a standard and/or proprietary format.

In the past, AlignRite Corporation (a predecessor organization to Photronics, Inc.), attempted to expedite the delivery of the electronic data through the use of an Internet based delivery system. However, although the AlignRite System was capable of rapid delivery of the photomask data from a customer to the computer system of the photomask manufacturer and was capable of validating the accuracy of this data in real time, this prior system did not provide for the automated generation of photomask order data in a single standard and/or proprietary format. In this regard, once the data was received from the customer, standard modifications to the data would also have to be entered manually by operators. Each time a manual change would have to be entered, the risk of human error increased and the overall length of the job would be extended.

Others have disclosed systems in which manufacturing and billing data are down-loaded over the Internet and verified on-line automatically. One such system is described in PCT Publication Number 02/03141, published on Jan. 10, 2002 to DuPont Photomask, Inc. More particularly, the DuPont Publication discloses a system in which photomask order data is entered on-line by a customer and transmitted to a photomask manufacturer for processing. In this system, a customer is prompted to enter photomask order data. Such data is transmitted to a photomask manufacturer, who in turn performs a diagnostic evaluation of the data. If any data is incomplete or inaccurate, the system sends a message to the customer notifying him of such error. Thereafter, the user must correct the error. After the data has been validated by the manufacturer (and corrected when necessary), the manufacturer processes this data and puts it into a standard (or proprietary) format, such as the SEMI P10 standard format.

Although useful for diagnostic purposes, the system of the DuPont PCT Publication does not prevent errors from being entered in a photomask order. In this regard, this system is only able to identify errors in a photomask order after the order has been entered by a customer and transmitted to a photomask manufacturer. Upon receiving the order, the photomask manufacturer validates the order information, and if it detects an error, sends an error message to the customer and prompts the customer to correct such error. Additionally, this system does not place the entered photomask order data into a standard format until after it has been validated and received by the photomask manufacturer. In other words, the manufacturer is required to condition the data entered by a customer into a standard format for manufacturer. As a result, a great deal of time is wasted correcting the customer's data entry mistakes and converting the data into a standard format. Thus, there is a long felt need for a system and method which generates photomask orders in a standard and/or proprietary order format and prevents errors during data entry and prior to transmission to a photomask manufacturer.

Figure 4:
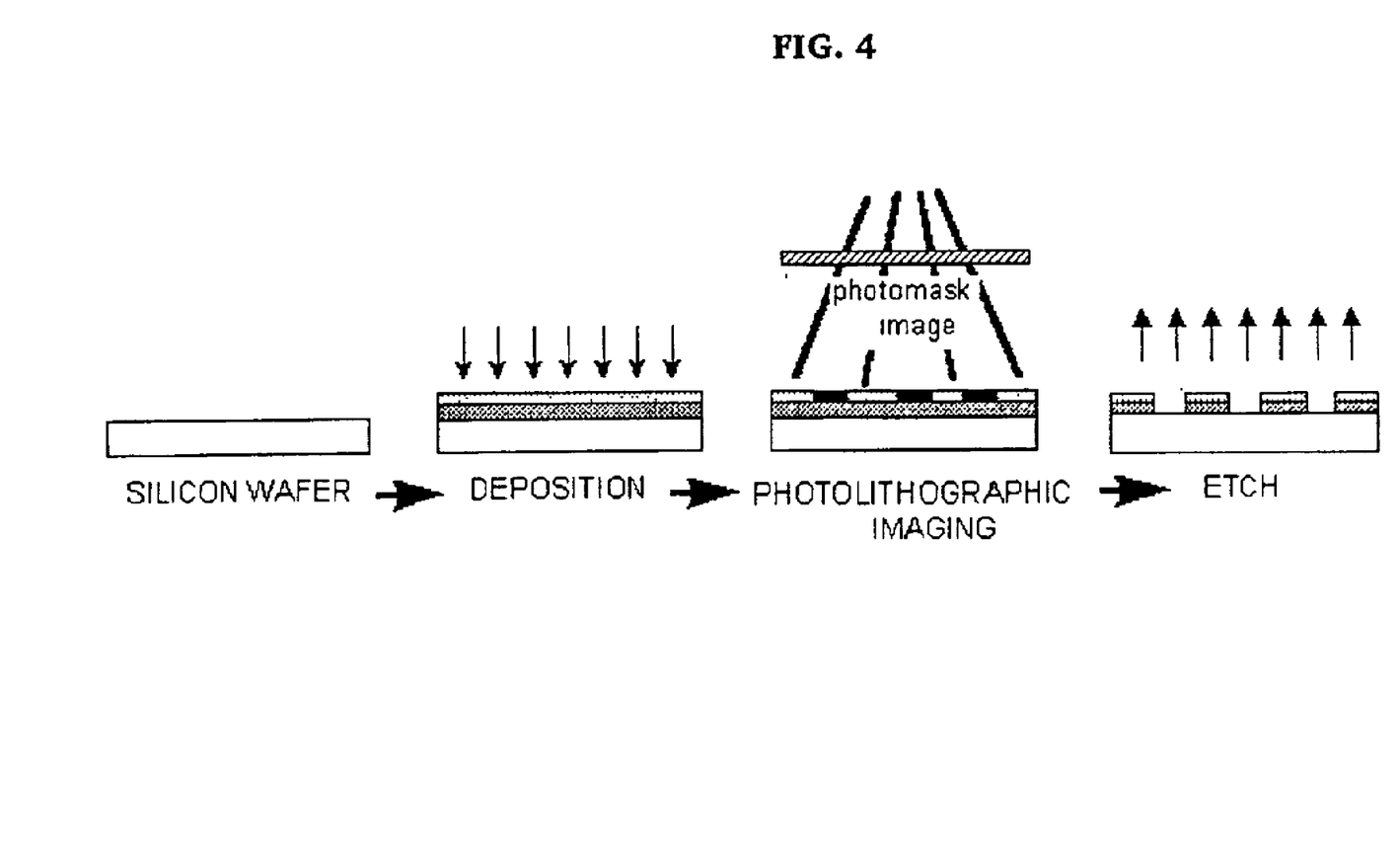
FIG. 4 is a flowchart showing the method of using a processed photomask to make or process a semiconductor wafer.

After the manufacturing steps described above are completed, the completed photomask is sent to a customer for use to manufacture semiconductor and other products. In particular, photomasks are commonly used in the semiconductor industry to transfer micro-scale images defining a semiconductor circuit onto a silicon or gallium arsenide substrate or wafer. The process for transferring an image from a photomask to a silicon substrate or wafer is commonly referred to as lithography or microlithography. Typically, as shown in FIG. 4, the semiconductor manufacturing process comprises the steps of deposition, photolithography, and etching. During deposition, a layer of either electrically insulating or electrically conductive material (like a metal, polysilicon or oxide) is deposited on the surface of a silicon wafer. This material is then coated with a photosensitive resist. The photomask is then used much the same way a photographic negative is used to make a photograph. Photolithography involves projecting the image on the photomask onto the wafer. If the image on the photomask is projected several times side by side onto the wafer, this is known as stepping and the photomask is called a reticle.

Figure 5:
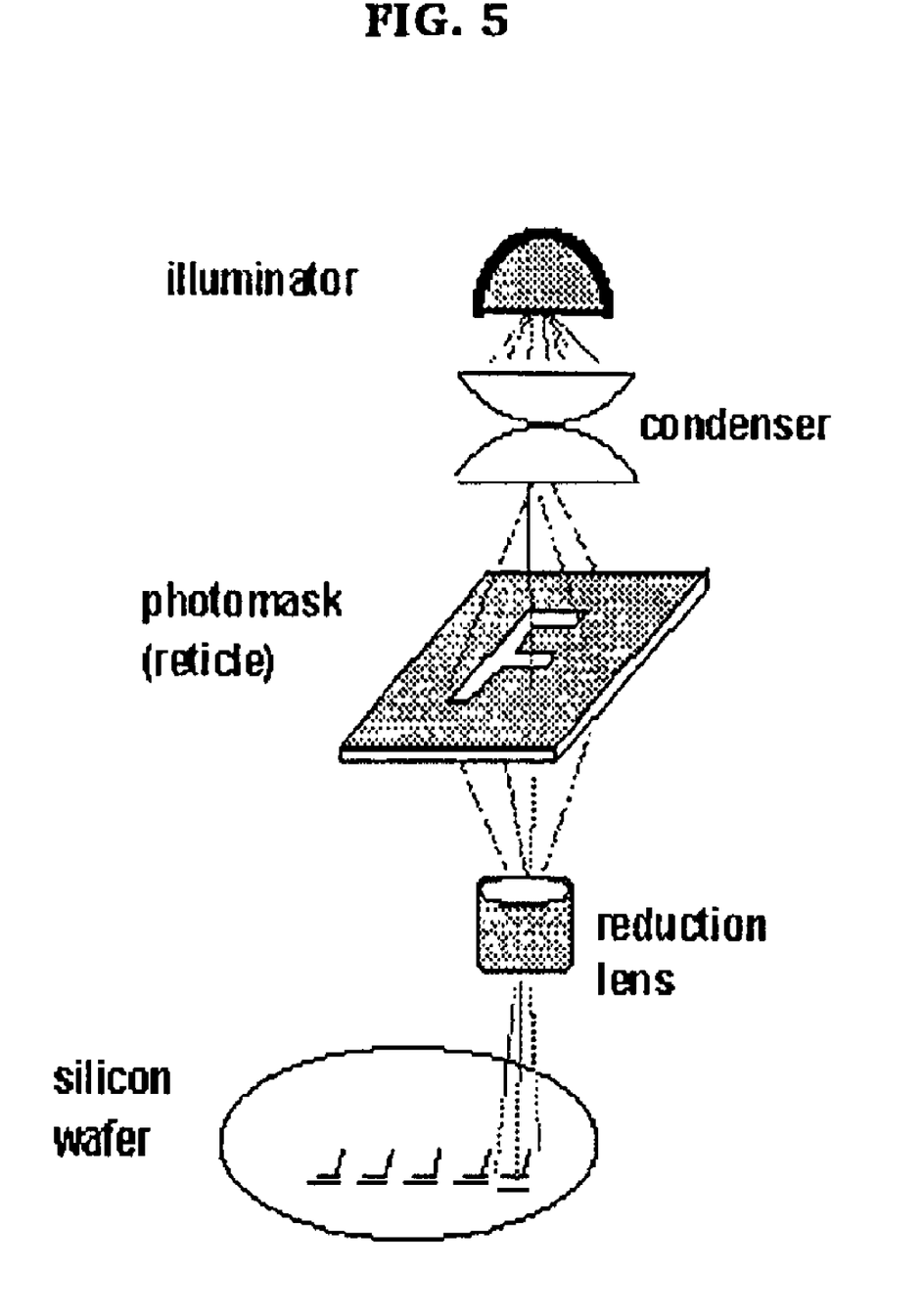
FIG. 5 shows the process of making a semiconductor using a wafer stepper.

As shown in FIG. 5, to create an image 21 on a semiconductor wafer 20, a photomask 10 is interposed between the semiconductor wafer 20, which includes a layer of photosensitive material, and an optical system 22. Energy generated by an energy source 23, commonly referred to as a Stepper, is inhibited from passing through the areas of the photomask 10 where the opaque material is present. Energy from the Stepper 23 passes through the transparent portions of the quartz substrate 11 not covered by the opaque material 12 and the antireflective material 13. The optical system 22 projects a scaled image 24 of the pattern of the opaque material 12 and 13 onto the semiconductor wafer 20 and causes a reaction in the photosensitive material on the semiconductor wafer. The solubility of the photosensitive material is changed in areas exposed to the energy. In the case of a positive photolithographic process, the exposed photosensitive material becomes soluble and can be removed. In the case of a negative photolithographic process, the exposed photosensitive material becomes insoluble and unexposed soluble photosensitive material is removed.

After the soluble photosensitive material is removed, the image or pattern formed in the insoluble photosensitive material is transferred to the substrate by a process well known in the art which is commonly referred to as etching. Once the pattern is etched onto the substrate material, the remaining resist is removed resulting in a finished product. A new layer of material and resist is then deposited on the wafer and the image on the next photomask is projected onto it. Again the wafer is developed and etched. This process is repeated until the circuit is complete. Because, in a typical semiconductor device many layers may be deposited, many different photomasks may be necessary for the manufacture of even a single semiconductor device. Indeed, if more than one piece of equipment is used by a semiconductor manufacturer to manufacturer a semiconductor device, it is possible more than one photomask may be needed, even for each layer. Furthermore, because different types of equipment may also be used to expose the photoresist in the different production lines, even the multiple identical photomask patterns may require additional variations in sizing, orientation, scaling and other attributes to account for differences in the semiconductor manufacturing equipment. Similar adjustments may also be necessary to account for differences in the photomask manufacturer's lithography equipment. These differences need to be accounted for in the photomask manufacturing process.

While the prior art is of interest, the known methods and apparatus of the prior art present several limitations which the present invention seeks to overcome.

In particular, it is an object of the present invention to provide a rule-based system and method for automatically generating a photomask order into one or more standard and/or proprietary formats, wherein the rules can be adapted or modified to meet any number of different standard and/or proprietary formats now known or hereinafter developed.

It is another object of the present invention to provide a rule-based system and method for automatically generating a photomask order into one or more standard and/or proprietary formats, wherein the system and method requires a user to follow a set of rules associated with a standard and/or proprietary format for photomask orders.

It is another object of the present invention to provide a rule-based system and method for automatically generating a photomask order into one or more standard and/or proprietary formats, wherein an order is generated by merging existing photomask order(s) and/or templates containing photomask data into a single, new order.

It is another object of the present invention to provide a rule-based photomask order system and method for reducing photomask order and data entry times.

It is another object of the present invention to provide a rule-based photomask order system and method for reducing transcription errors associated with the manual entry of photomask orders.

It is another object of the present invention to provide a rule-based photomask order system and method for increasing the overall output of photomasks being manufactured.

It is another object of the present invention to solve the shortcomings of the prior art.

Other objects will become apparent from the foregoing description.

SUMMARY OF THE INVENTION

It has now been found that the above and related objects of the present invention are obtained in the form of a rule-based system and method for generating a photomask order into a specified standard and/or proprietary photomask order format, wherein the system and method can be adapted to generate an order in a variety of different standard and/or proprietary formats.

More particularly, the system includes a server and an external data storage media stored on the server. Rules and templates for facilitating the entry of photomask order data and for generating an order are stored in the external storage media. The external data storage media may be a variety of different types of storage media, including, but not limited to, a relational database, an object-oriented class, an XML file and other similar storage media now known or hereinafter developed. By maintaining the storage media external to the system and by providing flexibility in the type of storage media that can be used with the system and method of the present invention, a variety of different users and automated systems may operate the system dynamically across a variety of different platforms.

The external data storage media has stored thereon at least one template for the entry and storage of photomask order data, wherein the template is created based upon the requirements of a specified photomask order format. Additionally, the external data storage media includes at least one first set of rules corresponding to the at least one template, wherein the first set of rules include instructions which ensure that a user enters complete information into the template as required by the specified order format. Additionally, the external data storage media includes at least one second set of rules which corresponds to said at least one template, wherein the second set of rules include instructions which ensure that the user enters accurate information into the template as required by the specified format. Additionally, the system includes a graphical user interface in communication with the server, wherein the user can create and modify templates, create and modify photomask order data, access the template(s) to enter photomask order data and generate an order in a specified format. These orders are saved on the system and can be used by a user at a later time to create new orders based on the information saved in the order.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAIL DESCRIPTION OF THE PREFERRED EMBODIMENT(S)

The present invention relates to a computerized rule-based system and method for automatically generating photomask orders in a specified format, wherein a photomask customer desiring to place an order for a photomask is guided through the process of entering an order in a complete and accurate manner in accordance with the requirements of the specified order format. To carry out these functions, the system and method utilizes the following four components to generate a photomask order into a desired format: (1) templates in which data is entered; (2) rules for converting the data entered in the templates into a specified standard and/or proprietary format; (3) a method for using templates to create a photomask order in a specified format; and (4) a separate set of rule for validating photomask order against a specified standard format. Software is implemented in this system to associate specific templates with specific rules to ensure that a customer enters complete and accurate photomask order information. Likewise, software is implemented in the system of the present invention to associate specific photomask orders with specific rules to ensure that a customer enters complete and accurate photomask order information.

Before describing this software, it is first necessary to describe the manner in which the templates, orders and rules are stored and organized. More particularly, the system includes a server and an external data storage media stored on the server. Rules and templates for facilitating the entry of photomask order data and for generating an order are stored in the external storage media. The external data storage media may be a variety of different types of storage media, including, but not limited to, a relational database, an object-oriented class, an XML file and other similar storage media now known or hereinafter developed. By maintaining the storage media external to the system and by providing flexibility in the type of storage media that can be used with the system and method of the present invention, a variety of different users and automated systems may operate the system dynamically across a variety of different platforms.

In a preferred embodiment, a set of templates and orders are created based on the requirements of a particular standard and/or proprietary photomask order format. In this regard, the templates and orders are organized as a hierarchy of components and subcomponents, wherein each component and subcomponent is defined by the requirements of a particular standard and/or proprietary photomask order format. For example, a particular photomask order format may require that the mask data component include certain subcomponents, such as a title, barcode and pattern data, to name a few. Each of these subcomponents may have further detailed subcomponents ("child component"). For example, the pattern data component, which is a subcomponent of the mask data component, may have a set of child components associated therewith. Depending upon the requirements of the standard and/or proprietary photomask order format, these child components may have additional subcomponents as well, which can in turn, have their own subcomponents and so forth and so on. Each component and subcomponent is defined by a set of attributes (e.g., binary, string, integer, real number, date, Boolean, list, etc.). Since templates are used to create photomask orders, the rules (discussed in more detail below) associated with a given template can be can be a subset of the rules associated with the photomask order that is created from the template. This will allow the user to leave certain information or components out of a template in the event that such information changes for each new order created from the given template. Table 1 demonstrates an example of how the components and subcomponents of the templates and orders may be organized according to a standard and/or proprietary photomask order format:

TABLE 1

Order
    Supplied Pattern Data
    Pattern Group
        Pattern
        Placement
    Mask Data
        Title
        Barcode
        OPC Definition
        Array
        Registration
        Measure File
        Registration
        Die to Data Inspection
        Die to Die Inspection
        Surface Definition
        Visual Inspection
        Pattern
            Critical Dimension
            Die to Die Inspection
            Die to Data Inspection
        Field
            Pattern
                Critical Dimension
                Die to Die Inspection
                Die to Data Inspection Preferably, each template and order is stored in a database, but may also be stored in other locations. A search engine may be provided on which users can search for a particular template or order stored in the database. Using the search engine, the user can locate the appropriate templates that are needed to generate a photomask in a particular order format. Once such templates are located, data relating to a photomask order is entered by a user (typically, a photomask customer desiring to place an order for a photomask). The user can also use the search engine to locate existing photomask orders for the purpose of completing the data entry or modifying their content, as described below.

As noted above, a customer may not have sufficient knowledge of the requirements of a particular photomask order format, and thus, may not enter all necessary information required by such standards to complete an order. Additionally, customers are prone to making data entry errors, and thus, may provide inaccurate information. Accordingly, a first and second set of rules are established and stored on the system to ensure that the customer enters complete and accurate data into the templates and orders, as required by a particular standard and/or proprietary photomask order format.

In the preferred embodiment, the first set of rules are established to ensure that a user inputs all necessary data to output a complete photomask order, as specified by a particular standard and/or proprietary photomask order format. Preferably, the first set of rules are established based on the requirements of a selected photomask order format. In this regard, the first set of rules dictate whether data "must" be input, "can" be input and/or "must not" be input into each component and subcomponent of a template or order, as dictated by the specified photomask order format. Additionally, the first set of rules should be configured such that they will require the user to enter information into any other components which are required (as set forth in a particular standard and/or proprietary photomask order format) to complete a photomask order.

Thus, for example, referring to Table 1, a particular standard order format may require, with respect to the "Pattern" template, that for all EAPSM orders: placement data and critical dimensions data must be provided; die to die inspection data may be provided; and die to data cannot be provided. Accordingly, rules are established and associated with the appropriate templates (and components and sub-components) which require that: 1) the user "must" include placement data and critical dimension data; 2) the user "can" include die to die inspection data; and 3) the user "must not" include die to data inspection data. Accordingly, in this example, when a user seeks to create an order for an EAPSM using the system and method of the present invention, the rules will: 1) require the user to input placement and critical dimension data; 2) permit (but not require) a user to enter die to die inspection data; and 3) preclude a user from entering die to data inspection. Additionally, the selected order format may require that in addition to Pattern Data, Array Registration data must also be entered to complete a photomask order. Accordingly, the first set of rules would also be configured such that once the user has completed entering all the pattern data, the user will be guided to the "Array Registration" template and be prompted to enter all required data into that template (and any other corresponding subcomponents of that template) as well. Similarly, if the standard and/or proprietary photomask order format requires the entry of data into any other templates to complete a photomask order, the first set of rules will guide the user to such other templates after the user has entered all data into the Array Registration template, and prompt the user to enter all required data into such template(s). Once the user has entered data in all required templates, the user will be permitted to finalize the template (subject to entering data according to the second set of rules as discussed below).

Thus, as should be apparent, the first set of rules of the present invention ensure that the user enters the necessary information into the appropriate templates as required by a particular standard and/or proprietary format to generate a photomask order. Put another way, the rules guide a user through the process of entering photomask order data to ensure that all necessary order information is entered into the templates.

Additionally, the system and method also provide for a second set of rules which ensure that a user inputs data in an accurate and proper format, as specified by a particular standard and/or proprietary photomask order format. As noted above, each component and subcomponent of a template is defined by a set of attributes (e.g., binary, string, integer, real number, date, Boolean, list, etc.). Thus, in a preferred embodiment, a second set of rules are established for each template and order that indicates to the user whether the data entered into a particular template or order "must", "can" and/or "must not" have a particular attribute, as required by a particular standard and/or proprietary photomask order format. For example, referring to Table 1, a particular standard and/or proprietary photomask order format may require that: 1) the data entered into the placement template "must" be an integer; 2) the data entered into the title template "can" be a string; and 3) the data entered into the critical dimension template "must not" be a string. Accordingly, a rule is established for the placement template which: 1) requires the user to enter an integer in the placement template; 2) allows the user to enter a string into the title template; and 3) prevents the user from entering a string into the critical dimension template. Thus, as should be apparent, the rules of the present invention ensure that the user enters the appropriate type of information into each template as required by a particular standard and/or proprietary photomask order format to generate a photomask order. Put another way, the second set of rules only permit the user to enter a certain type of data into a template, and thus, reduce the possibility of there being design errors and/or data entry errors in the process of placing a photomask order.

In a preferred embodiment, the first and second set of rules described herein are created and stored separately. As noted above, the rules may be stored either internal or external to the system in any different number of dynamic formats (e.g., as a database, an object-oriented class, an XML file, etc.) so that the system may be adapted to run on any number of platforms, depending the preferences or a user and/or automated system. It should be noted, however, that a single set of rules can be created and stored, provided that such single set of rules both ensures that a user both enters complete photomask order information (as described with reference to the first set of rules) and enters accurate photomask order information (as described with reference to the second set of rules). Further, the first and second set of rules may be combined as a single set of rules in a similar manner.

As noted above, the present invention includes a function to associate specific first and second sets of rules with specific templates, to ensure that a photomask order is generated in a complete and accurate manner. In the preferred embodiment, this functionality is provided in the form of a software-based application installed on the computer of an entity desiring to place an order for a photomask, such as a semiconductor manufacturer. Unlike the prior art, this software is not dependent on a given photomask manufacturer's manufacturing process. Rather, the software of the present invention can be deployed as a stand-alone secure application, a network distributed application or a web-based "thin-client" application. Preferably, the software is utilized in a client-server system, wherein a graphical user interface (e.g., the client) connects to and retrieves data from a database on the server. In all cases, the customer running the software of the present invention is not required to access and/or login to any external local area network of a photomask manufacturer to place an order.

The manner in which the software of the present invention associates specific rules with specific templates is now described. In particular, since the templates are hierarchical collections of data, each element of a template is interpreted by an associated software object. In the preferred embodiment, rules are embedded within the software objects and are responsible for the assembly of the data entered in the templates. These rules are constraints or instructions, such as an algorithm, and typically relate to one or more attributes of the software object. Accordingly, with this arrangement, it is possible to enter a complete and accurate photomask order as the rules and templates are appropriately associated with each other.

Additionally, the system is preferably configured to permit the rules and templates to be separately updated should the need arise. In this regard, the current standard photomask order format is known as the SEMI P-10 standard format. However, it is anticipated that as technological advances are made, a new standard format may be developed to cover these advances, and thus, replace the current SEMI P-10 standard format. Additionally, there are currently many other international standard order formats that are used by photomask manufacturers overseas. As with the SEMI P-10 format, it is expected that these international formats will also change or be replaced over time. Thus, the system of the present invention provides for the ability to update the rules and templates to meet these changes. More particularly, the first and second sets of rules are preferably stored as separate files from each of the templates, which are in turn also each stored as separate files. By keeping the rules and templates separate, any modification to one will have no effect on the other. In this regard, when the rules or templates are modified, there will be no need for a correlative code change to a corresponding element where none would be indicated by the proximate feature modification. Additionally, by storing the rules and templates separately, the possibility of the occurrence of a system seize-up (e.g., where unanticipated changes to an embedded or inner-nested element might cause an unanticipated failure) can be avoided. In this regard, if rules and templates were not stored separately, independent modification would be impossible. Each existing template, of which there could be thousands, would then have to be modified individually to include the new rules. Thus, as should be readily apparent, the system and method of the present invention is not limited to any one particular standard format, but rather can be easily adapted to conform to the requirements of any current or newly developed standard photomask order format. Similarly, a customer may change its proprietary order format to meet any changes associated with new developments or improved technologies.

To modify the rules, software objects are established such that the rules contained therein may affect one or more of its attributes, its children or other rules contained within it. In this regard, the rules are established such that only certain specified attributes are affected by rules. Thus, since the software objects, like templates, are hierarchical in nature, they know both their parent and children. Accordingly, any time a child object is modified, it notifies its parent of the area, rules or attributes impacted by the change. As a result, any change made anywhere within the hierarchy of rules is propagated through the entire family. Accordingly, the rules have the capability to enforce the addition of, or the removal of, any child element of the parent. Thus, within the application, each object is individually updateable through subsequent releases of the software. Additionally, object parents maintain a standard collection for each type of child element, which can be added or removed while the template is being constructed.

Templates can also be modified in response to a modification of a standard and/or proprietary photomask order format which requires the addition of new attributes and/or subcomponents to be added to hierarchy of orders and templates. In such instances, the new relationships are defined for affected components and/or subcomponents and new rules are dynamically added to the existing rule schema.

To illustrate these features of the present invention, the following example is now described. The current Semi P-10 standard requires that a photomask order include, among other things: Mask Order[ ], Mask Set [ ], Mask Definition [ ], and Pattern Definition[ ]. Thus, according to this requirement, the following templates would be established: SemiOrder Template, SemiMaskSet Template, SemiMask Template and SemiPattern Template. Additionally, a first and second set of rules for each of these templates would be established which dictate whether data must be entered into each of the templates and the type of data that can be entered into such templates. However, at a later point in time, the Semi P-10 standard may be replaced by a new standard that requires a CD component. Thus, the existing templates (e.g., SemiPattern) could be modified to include, for example, a CD component to conform to a modification of the metrology aspect of the SEMI P-10 standard. Additionally, a new template could be created to conform to any newly added aspects (e.g., registration) of the new SEMI standard. Similarly, the already existing first and second set of rules could be adapted to meet the changes associated with the modified CD component aspect of the current SEMI P-10 standard. Additionally, a new set of first and second set of rules could be created to conform to the new registration feature of the new SEMI standard.

Another aspect of the present invention is that it provides for the ability to generate new photomask orders by: (1) merging data into a new order from an already existing template having data contained therein; (2) merging data into a new order from an already existing order having data contained therein; or (3) merging data into a new order from already existing templates and orders. In this regard, whenever a user enters data into either a template or creates an order, such template and/or order is saved on the system of the present invention. Thereafter, a user is able to access the already existing templates and/or orders and use the data saved therein to generate a new order. By providing a user of the system of the present invention with the ability to merge data from already existing orders and/or templates, the process for entering photomask order data is greatly reduced, thereby reducing the overall time it takes to manufacture a photomask order. Each of the three methods for merging data into an order is described below.

In one embodiment, to create a new order from an existing template(s), the user is prompted to create a new, blank order. Next, the user is provided with the option of selecting templates and/or orders which were created and saved from a previous photomask order. Depending upon the type of photomask to be manufactured from the new order, the user selects and loads the most relevant template(s) stored in the relational database. The selected template is displayed to the user with previously entered data. For each non-null object within the template (e.g., the object contains data), the user may either select the previously entered data into the new order or over-write this data with new data. Additionally, to the extent that a particular object within a template is null (e.g., it is already empty), the user may enter appropriate data within that object. Next, the rules established for this order operate as described above to ensure that data is accurately and completely entered. Thereafter, the software processes this information and generates a new order based on this information.

The process for creating a new order from an already existing order is similar to the process of creating a new order from an already existing template. In this embodiment, to create a new order from an existing order(s), the user is prompted to create a new, blank order. Next, the user is provided with the option of selecting templates and/or orders which were created and saved from a previous photomask order. Depending upon the type of photomask to be manufactured from the new order, the user selects and loads the relevant order(s) stored in a relational database. The selected order is displayed to the user with previously entered data. For each non-null object within the order, the user may either select the previously entered data into the new order or over-write this data with new data. Additionally, to the extent that a particular object within an order is null, the user may enter appropriate data within that object. Next, the rules established for this order operate as described above to ensure that data is accurately and completely entered. Thereafter, the software processes this information and generates a new order based on this information.

In yet another embodiment, to create a new order from both an existing template(s) and order(s), the user is prompted to create a new, blank order. Next, the user is provided with the option of selecting templates and/or orders which were created and saved from a previous photomask order. Depending upon the type of photomask to be manufactured from the new order, the user selects and loads the relevant template(s) stored in a relational database. The selected template is displayed to the user with previously entered data. For each non-null object within the template, the user may either select the previously entered data into the new order or over-write this data with new data. Additionally, to the extent that a particular object within a template is null, the user may enter appropriate data within that object. Next, the rules established for this order operate as described above to ensure that data is accurately and completely entered. Additionally, previously saved orders may also be merged into the same order. In this regard, the user can select and load previously placed order(s) stored in a relational database. The selected order is displayed to the user with previously entered data. For each non-null object within the order (e.g., the object contains data), the user may either select the previously entered data into the new order or over-write this data with new data. Additionally, to the extent that a particular object within a order is already empty, the user may enter appropriate data within that object. Next, the rules established for this order operate as described above to ensure that data is accurately and completely entered. Once all of the appropriate templates and orders have been merged into the new order, the software processes this information and generates a new order based on this information.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A rule-based system for generating photomask orders in a specified format comprising:
   at least one template for the entry and storage of photomask order data, wherein said template is created based upon requirements of a specified photomask format;
   at least one first set of rules corresponding to said at least one template, wherein said first set of rules is stored separately from said at least one template and includes instructions which ensure that a user enters complete information into said template as required by the specified format;
   at least one second set of rules which corresponds to said at least one template, wherein said second set of rules is stored separately from said at least one template and includes instructions which ensure that the user enters accurate information to said template as required by the specified format; and
   a graphical user interface associated with at least one said template, wherein the user can access said at least one template to enter photomask order data and create an order in the specified format.

2. The system of claim 1, wherein said at least one template and said at least one first and second set of rules are set in accordance with the requirements of a particular standard and/or proprietary photomask format.

3. The system of claim 2, wherein said at least one template includes components, wherein data which can be entered into said components are set in accordance with the requirements of a particular standard and/or proprietary photomask format.

4. The system of claim 2, wherein said at least one template includes subcomponents, wherein data which can be entered into said subcomponents are set in accordance with the requirements of a particular standard and/or proprietary photomask format.

5. The system of claim 2, wherein said at least one template includes components and subcomponents, wherein data which can be entered into said components and subcomponents are set in accordance with the requirements of a particular standard and/or proprietary photomask format.

6. The system of claim 5, wherein the type of data that can be entered into said components and said subcomponents is limited to specific attributes set in accordance with the requirements of a particular standard and/or proprietary photomask format.

7. The system of claim 1, wherein said first set of rules specify the type of photomask data which must, can and/or must not be entered to complete a photomask order in a specified format.

8. The system of claim 1, wherein said second set of rules specify the format in which the photomask data required to be entered by said first set of rules must, can and/or must not be input.

9. The system of claim 8, wherein said format is a binary, string, integer, real number, date, Boolean and/or a list.

10. The system of claim 1, wherein said system includes instructions for associating said first and second sets of rules with said templates.

11. The system of claim 1, wherein said first and second sets of rules are combined to form a single set of rules.

12. The system of claim 1, wherein said templates and said first and second sets of rules are stored external to the system.

13. The system of claim 12, wherein said templates and said first and second sets of rules are stored in a relational database.

14. The system of claim 12, wherein said templates and said first and second sets of rules are an XML file.

15. The system of claim 12, wherein said first and second sets of rules and templates are stored as an object-oriented class.

16. The system of claim 1, further comprising a search engine for searching for specific templates and/or order data previously generated on said system and merging said previously generated templates and/or order data into at least one new template and/or order.

17. The system of claim 1, wherein said at least one template is interpreted by a software object and said at least one first and second sets of rules are embedded within said software objects.

18. The system of claim 17, wherein said at least one first and second sets of rules include instructions which relate to one or more attributes of said software objects.

19. The system of claim 18, wherein said software objects are hierarchical.

20. The system of claim 1, wherein said system is deployed as a stand-alone secure application.

21. A rule-based system for generating photomask orders and/or templates in a specified format comprising:
    at least one template for the entry and storage of photomask order data, wherein said template is created based upon requirements of a specified photomask format;
    at least one set of rules corresponding to said at least one template, wherein said rules govern the entry of photomask order data into said template as required by the specified format,
    a graphical user interface associated with said at least one template, wherein the user can access said at least one template to enter photomask order data and create an order in the specified format; and
    a search engine for locating preexisting photomask order data and/or at least one preexisting template and merging at least a portion of said preexisting order data or said at least one preexisting template into a new order and/or new template in the specified format.

22. The system of claim 21, wherein said at least one template and said at least one set of rules are set in accordance with the requirements of a particular standard and/or proprietary photomask format.

23. The system of claim 22, wherein said at least one template includes components, wherein data which can be entered into said components are set in accordance with the requirements of a particular standard and/or proprietary photomask format.

24. The system of claim 22, wherein said at least one template includes subcomponents, wherein data which can be entered into said subcomponents are set in accordance with the requirements of a particular standard and/or proprietary photomask format.

25. The system of claim 22, wherein said at least one template includes components and subcomponents, wherein data which can be entered into said components and subcomponents are set in accordance with the requirements of a particular standard and/or proprietary photomask format.

26. The system of claim 25, wherein the type of data that can be entered into said components and said subcomponents is limited to specific attributes set in accordance with the requirements of a particular standard and/or proprietary photomask format.

27. The system of claim 21, wherein said at least one set of rules includes instructions for ensuring that a user enters complete and accurate information into said at least one template.

28. The system of claim 27, wherein said at least one set of rules specify the format and type of photomask data which must, can and/or must not be entered.

29. The system of claim 28, wherein said format is a binary, string, integer, real number, date, Boolean and/or a list.

30. The system of claim 21, wherein said system includes instructions for associating said at least one first set of rules with said at least one template.

31. The system of claim 21, wherein said templates and said at least one set of rules is stored external to the system.

32. The system of claim 31, wherein said templates and said at least one set of rules is stored in a relational database.

33. The system of claim 31, wherein said templates and said at least one set of rules is an XML file.

34. The system of claim 31, wherein said at least one set of rules is stored as an object-oriented class.

35. The system of claim 21, wherein said at least one template is interpreted by a software object and said at least one set of rules is embedded within said software objects.

36. The system of claim 35, wherein said at least one set of rules includes instructions which relate to one or more attributes of said software objects.

37. The system of claim 36, wherein said software objects are hierarchical.

38. The system of claim 21, wherein said system is deployed as a stand-alone secure application.

39. A rule-based system for generating photomask orders in a specified format comprising:
    at least one template for the entry and storage of photomask order data, wherein said template is created based upon requirements of a specified photomask format;
    at least one set of rules corresponding to said at least one template, wherein said rules govern the entry of photomask order data into said template as required by the specified format;
    a graphical user interface associated with said at least one template, wherein the user can access said at least one template to enter photomask order data and create an order in the specified format; and
    said at least one template includes components and subcomponents, wherein one or more subcomponents may be copied to one or more other subcomponents within said order in the specified format.

40. The system of claim 39, wherein said at least one template and said at least one set of rules are set in accordance with the requirements of a particular standard and/or proprietary photomask format.

41. The system of claim 40, wherein data which can be entered into said components is set in accordance with the requirements of a particular standard and/or proprietary photomask format.

42. The system of claim 40, wherein data which can be entered into said subcomponents is set in accordance with the requirements of a particular standard and/or proprietary photomask format.

43. The system of claim 40, wherein data which can be entered into said components and subcomponents is set in accordance with the requirements of a particular standard and/or proprietary photomask format.

44. The system of claim 43, wherein the type of data that can be entered into said components and said subcomponents is limited to specific attributes set in accordance with the requirements of a particular standard and/or proprietary photomask format.

45. The system of claim 39, wherein said at least one set of rules includes instructions for ensuring that a user enters complete and accurate information into said at least one template.

46. The system of claim 45, wherein said at least one set of rules specify the format and type of photomask data which must, can and/or must not be entered.

47. The system of claim 46, wherein said format is a binary, string, integer, real number, date, Boolean and/or a list.

48. The system of claim 39, wherein said system includes instructions for associating said at least one first set of rules with said at least one template.

49. The system of claim 39, wherein said templates and said at least one set of rules is stored external to the system.

50. The system of claim 49, wherein said templates and said at least one set of rules is stored in a relational database.

51. The system of claim 49, wherein said templates and said at least one set of rules is an XML file.

52. The system of claim 49, wherein said at least one set of rules is stored as an object-oriented class.

53. The system of claim 49, wherein said at least one template is interpreted by a software object and said at least one set of rules is embedded within said software objects.

54. The system of claim 53, wherein said at least one set of rules includes instructions which relate to one or more attributes of said software objects.

55. The system of claim 54, wherein said software objects are hierarchical.

56. The system of claim 39, wherein said system is deployed as a stand-alone secure application.

57. The system of claim 39, wherein said at least one template and said at least one set of rules are stored separately.

58. The system of claim 39, further comprising a search engine for searching for specific templates and/or order data previously generated on said system and merging said previously generated templates and/or order data into at least one new template and/or order.

59. A rule-based system for generating photomask orders in a specified format comprising:
at least one template for the entry and storage of photomask order data, wherein said template is created based upon requirements of a specified photomask format;
at least one set of rules corresponding to said at least one template, wherein said rules govern the entry of photomask order data into said template as required by the specified format, wherein rules are stored independently of said at least one template; and
a graphical user interface associated with said at least one template, wherein the user can access said at least one template to enter photomask order data and create an order in the specified format.

60. The system of claim 59, wherein said at least one template and said at least one set of rules are set in accordance with the requirements of a particular standard and/or proprietary photomask format.

61. The system of claim 60, wherein said at least one template includes components, wherein data which can be entered into said components are set in accordance with the requirements of a particular standard and/or proprietary photomask format.

62. The system of claim 60, wherein said at least one template includes subcomponents, wherein data which can be entered into said subcomponents are set in accordance with the requirements of a particular standard and/or proprietary photomask format.

63. The system of claim 60, wherein said at least one template includes components and subcomponents, wherein data which can be entered into said components and subcomponents are set in accordance with the requirements of a particular standard and/or proprietary photomask format.

64. The system of claim 63, wherein the type of data that can be entered into said components and said subcomponents is limited to specific attributes set in accordance with the requirements of a particular standard and/or proprietary photomask format.

65. The system of claim 59, wherein said at least one set of rules includes instructions for ensuring that a user enters complete and accurate information into said at least one template.

66. The system of claim 65, wherein said at least one set of rules specify the format and type of photomask data which must, can and/or must not be entered.

67. The system of claim 66, wherein said format is a binary, string, integer, real number, date, Boolean and/or a list.

68. The system of claim 59, wherein said system includes instructions for associating said at least one first set of rules with said at least one template.

69. The system of claim 59, wherein said templates and said at least one set of rules is stored external to the system.

70. The system of claim 69, wherein said templates and said at least one set of rules is stored in a relational database.

71. The system of claim 59, wherein said templates and said at least one set of rules is an XML file.

72. The system of claim 59, wherein said at least one set of rules is stored as an object-oriented class.

73. The system of claim 59, wherein said at least one template is interpreted by a software object and said at least one set of rules is embedded within said software objects.

74. The system of claim 73, wherein said at least one set of rules includes instructions which relate to one or more attributes of said software objects.

75. The system of claim 74, wherein said software objects are hierarchical.

76. The system of claim 59, wherein said system is deployed as a stand-alone secure application.

77. The system of claim 59, further comprising a search engine for searching for specific templates and/or order data previously generated on said system and merging said previously generated templates and/or order data into at least one new template and/or order.

78. A rule-based system for generating photomask orders in at least two different specified formats comprising:
at least one template for the entry and storage of photomask order data, wherein said template is created based upon requirements of a specified photomask format;
at least one set of rules corresponding to said at least one template, wherein said at least one set of rules includes instructions which ensure that a user enters complete and/or accurate information into said template as required by said at least two different formats,
a graphical user interface associated with said at least one template, wherein the user can access said at least one template to enter photomask order data and create an order in said at least two different specified formats.

79. The system of claim 78, wherein said at least one template and said at least one set of rules are set in accordance with the requirements of a particular standard and/or proprietary photomask format.

80. The system of claim 79, wherein said at least one template includes components, wherein data which can be entered into said components are set in accordance with the requirements of a particular standard and/or proprietary photomask format.

81. The system of claim 79, wherein said at least one template includes subcomponents, wherein data which can be entered into said subcomponents are set in accordance with the requirements of a particular standard and/or proprietary photomask format.

82. The system of claim 79, wherein said at least one template includes components and subcomponents, wherein data which can be entered into said components and subcomponents are set in accordance with the requirements of a particular standard and/or proprietary photomask format.

83. The system of claim 82, wherein the type of data that can be entered into said components and said subcomponents is limited to specific attributes set in accordance with the requirements of a particular standard and/or proprietary photomask format.

84. The system of claim 78, wherein said at least one set of rules includes instructions for ensuring that a user enters complete and accurate information into said at least one template.

85. The system of claim 84, wherein said at least one set of rules specify the format and type of photomask data which must, can and/or must not be entered.

86. The system of claim 85, wherein said format is a binary, string, integer, real number, date, Boolean and/or a list.

87. The system of claim 78, wherein said system includes instructions for associating said at least one first set of rules with said at least one template.

88. The system of claim 78, wherein said templates and said at least one set of rules is stored external to the system.

89. The system of claim 88, wherein said templates and said at least one set of rules is stored in a relational database.

90. The system of claim 88, wherein said templates and said at least one set of rules is an XML file.

91. The system of claim 88, wherein said at least one set of rules is stored as an object-oriented class.

92. The system of claim 88, wherein said at least one template is interpreted by a software object and said at least one set of rules is embedded within said software objects.

93. The system of claim 92, wherein said at least one set of rules includes instructions which relate to one or more attributes of said software objects.

94. The system of claim 93, wherein said software objects are hierarchical.

95. The system of claim 78, wherein said system is deployed as a stand-alone secure application.

96. The system of claim 78, wherein said at least one template and said at least one set of rules are stored separately.

97. The system of claim 78, further comprising a search engine for searching for specific templates and/or order data previously generated on said system and merging said previously generated templates and/or order data into at least one new template and/or order.

98. A rule-based system for generating photomask orders in a specified format comprising:

at least one template for the entry and storage of photomask order data, wherein said template is created based upon requirements of a specified photomask format and wherein at least some of said photomask order data is imported from a preexisting order template;

at least one set of rules corresponding to said at least one template, wherein said rules govern the entry of photomask order data into said template as required by the specified format, a graphical user interface in with at least one said template, wherein the user can access said at least one template to enter photomask order data and create an order in the specified format.

99. The system of claim 98, wherein said at least one template and said at least one set of rules are set in accordance with the requirements of a particular standard and/or proprietary photomask format.

100. The system of claim 99, wherein said at least one template includes components, wherein data which can be entered into said components are set in accordance with the requirements of a particular standard and/or proprietary photomask format.

101. The system of claim 99, wherein said at least one template includes subcomponents, wherein data which can be entered into said subcomponents are set in accordance with the requirements of a particular standard and/or proprietary photomask format.

102. The system of claim 99, wherein said at least one template includes components and subcomponents, wherein data which can be entered into said components and subcomponents are set in accordance with the requirements of a particular standard and/or proprietary photomask format.

103. The system of claim 102, wherein the type of data that can be entered into said components and said subcomponents is limited to specific attributes set in accordance with the requirements of a particular standard and/or proprietary photomask format.

104. The system of claim 98, wherein said at least one set of rules includes instructions for ensuring that a user enters complete and accurate information into said at least one template.

105. The system of claim 104, wherein said at least one set of rules specify the format and type of photomask data which must, can and/or must not be entered.

106. The system of claim 105, wherein said format is a binary, string, integer, real number, date, Boolean and/or a list.

107. The system of claim 98, wherein said system includes instructions for associating said at least one first set of rules with said at least one template.

108. The system of claim 98, wherein said templates and said at least one set of rules is stored external to the system.

109. The system of claim 108, wherein said templates and said at least one set of rules is stored in a relational database.

110. The system of claim 108, wherein said templates and said at least one set of rules is an XML file.

111. The system of claim 108, wherein said at least one set of rules is stored as an object-oriented class.

112. The system of claim 108, wherein said at least one template is interpreted by a software object and said at least one set of rules is embedded within said software objects.

113. The system of claim 112, wherein said at least one set of rules includes instructions which relate to one or more attributes of said software objects.

114. The system of claim 113, wherein said software objects are hierarchical.

115. The system of claim 98, wherein said system is deployed as a stand-alone secure application.

116. The system of claim 98, wherein said at least one template and said at least one set of rules are stored separately.

117. The system of claim 98, further comprising a search engine for searching for specific templates and/or order data previously generated on said system and merging said previously generated templates and/or order data into at least one new template and/or order.

* * * * *